US011394776B2

(12) United States Patent
Kravtsov

(10) Patent No.: US 11,394,776 B2
(45) Date of Patent: Jul. 19, 2022

(54) SYSTEMS AND METHODS FOR TRANSPORT LAYER PROCESSING OF SERVER MESSAGE BLOCK PROTOCOL MESSAGES

(71) Applicant: Tuxera Inc., Espoo (FI)

(72) Inventor: Oleg Nikolaevich Kravtsov, Saint Petersburg (RU)

(73) Assignee: Tuxera, Inc., Espoo (FI)

( * ) Notice: Subject to any disclaimer, the term of this patent is extended or adjusted under 35 U.S.C. 154(b) by 136 days.

(21) Appl. No.: 16/002,588

(22) Filed: Jun. 7, 2018

(65) Prior Publication Data

US 2019/0379736 A1   Dec. 12, 2019

(51) Int. Cl.
| | |
|---|---|
| *G06F 15/16* | (2006.01) |
| *H04L 67/1097* | (2022.01) |
| *H04L 67/06* | (2022.01) |
| *H04L 69/18* | (2022.01) |
| *H04L 69/22* | (2022.01) |

(52) U.S. Cl.
CPC .......... *H04L 67/1097* (2013.01); *H04L 67/06* (2013.01); *H04L 69/18* (2013.01); *H04L 69/22* (2013.01)

(58) Field of Classification Search
CPC ..... H04L 67/06; H04L 67/1097; H04L 69/18; H04L 69/22
See application file for complete search history.

(56) References Cited

U.S. PATENT DOCUMENTS

| | | | |
|---|---|---|---|
| 6,453,354 B1* | 9/2002 | Jiang ................... | G06F 16/1774 709/229 |
| 2005/0251500 A1* | 11/2005 | Vahalia ............... | G06F 16/1774 |
| 2013/0007180 A1* | 1/2013 | Talpey .................... | H04L 47/39 709/212 |
| 2014/0032779 A1 | 1/2014 | Boucher et al. | |
| 2014/0115705 A1 | 4/2014 | Fujishima et al. | |
| 2018/0260125 A1* | 9/2018 | Botes ................... | G06F 16/275 |

FOREIGN PATENT DOCUMENTS

| | | |
|---|---|---|
| CN | 106326749 A | 1/2017 |
| EP | 1330725 B1 | 3/2012 |

OTHER PUBLICATIONS

International Search Report and Written Opinion for PCT/US2019/035813 dated Nov. 5, 2019, pp. 37.
Partial Supplemental European Search Report and Provisional Opinion for EP 19 815 642.4 dated Feb. 25, 2022, pp. 11.
Extended European Search Report and European Search Opinion for EP 19 815 642.4 dated Jun. 2, 2022, pp. 12.

* cited by examiner

*Primary Examiner* — Ryan J Jakovac
(74) *Attorney, Agent, or Firm* — J. Fish Law, PLLC

(57) ABSTRACT

This disclosure describes techniques for network file sharing. In one example, this disclosure describes systems and techniques for enabling network file sharing by processing server message block protocol messages. In one example, the systems and techniques for processing server message block protocol messages include transport layer processing of server message block protocol messages.

15 Claims, 11 Drawing Sheets

SYSTEMS AND METHODS FOR TRANSPORT LAYER PROCESSING OF SERVER MESSAGE BLOCK PROTOCOL MESSAGES

TECHNICAL FIELD

This disclosure relates to systems and methods for use with computer networking and more particularly to techniques for reading or writing file data from a network attached storage device.

BACKGROUND

Digital data may be stored on multiple types of storage devices including, for example, memory cards and disk drives. Storage devices may be connected to a network for utilization as a so-called network attached storage device. For example, an external hard disk drive may be attached to a network for utilization as a local media server. Devices configured for network communications including laptop or desktop computers, tablet computers, televisions, digital video recorders, set-top boxes, digital media players, video gaming devices, video game consoles, audio systems, and cellular telephones, including so-called smart phones, may access network attached storage devices. Access of digital data stored on network attached storage devices may be facilitated by utilizing a so-called layered communications model having various layers of abstraction. Each layer of abstraction may be associated with one or more defined network communications protocols. Examples of network communication protocols include Server Message Block (SMB) and Network File System (NFS) protocols.

SUMMARY

In general, this disclosure describes techniques for enabling efficient network file sharing. In particular, this disclosure describes systems and techniques for processing server message block protocol messages. In one example, the systems and techniques for processing server message block protocol messages described herein may improve the write performance when a computing device writes data to a file stored on a network attached storage device. It should be noted that incorporation by reference of documents herein is for descriptive purposes and should not be construed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

According to one example of the disclosure, a method comprises reading a transport packet header and a server message block header from a transport packet by invoking a first read call, wherein the transport packet includes a transport packet header, a server message block header, and a server message block data payload, checking a value of a command field from the read server message block header, and conditionally reading data from the server message block data payload based on whether the value of the command field indicates a write command.

According to another example of the disclosure, a device comprises one or more processors configured to read a transport packet header and a server message block header from a transport packet by invoking a first read call, wherein the transport packet includes a transport packet header, a server message block header, and a server message block data payload, check a value of a command field from the read server message block header, and conditionally read data from the server message block data payload based on whether the value of the command field indicates a write command.

According to another example of the disclosure, a non-transitory computer-readable storage medium comprises instructions stored thereon, that upon execution, cause one or more processors of a device to read a transport packet header and a server message block header from a transport packet by invoking a first read call, wherein the transport packet includes a transport packet header, a server message block header, and a server message block data payload, check a value of a command field from the read server message block header, and conditionally read data from the server message block data payload based on whether the value of the command field indicates a write command.

According to another example of the disclosure, an apparatus comprises means for reading a transport packet header and a server message block header from a transport packet by invoking a first read call, wherein the transport packet includes a transport packet header, a server message block header, and a server message block data payload, means for checking a value of a command field from the read server message block header, and means for conditionally reading data from the server message block data payload based on whether the value of the command field indicates a write command.

The details of one or more examples are set forth in the accompanying drawings and the description below. Other features, objects, and advantages will be apparent from the description and drawings, and from the claims.

DETAILED DESCRIPTION

Figure 1:
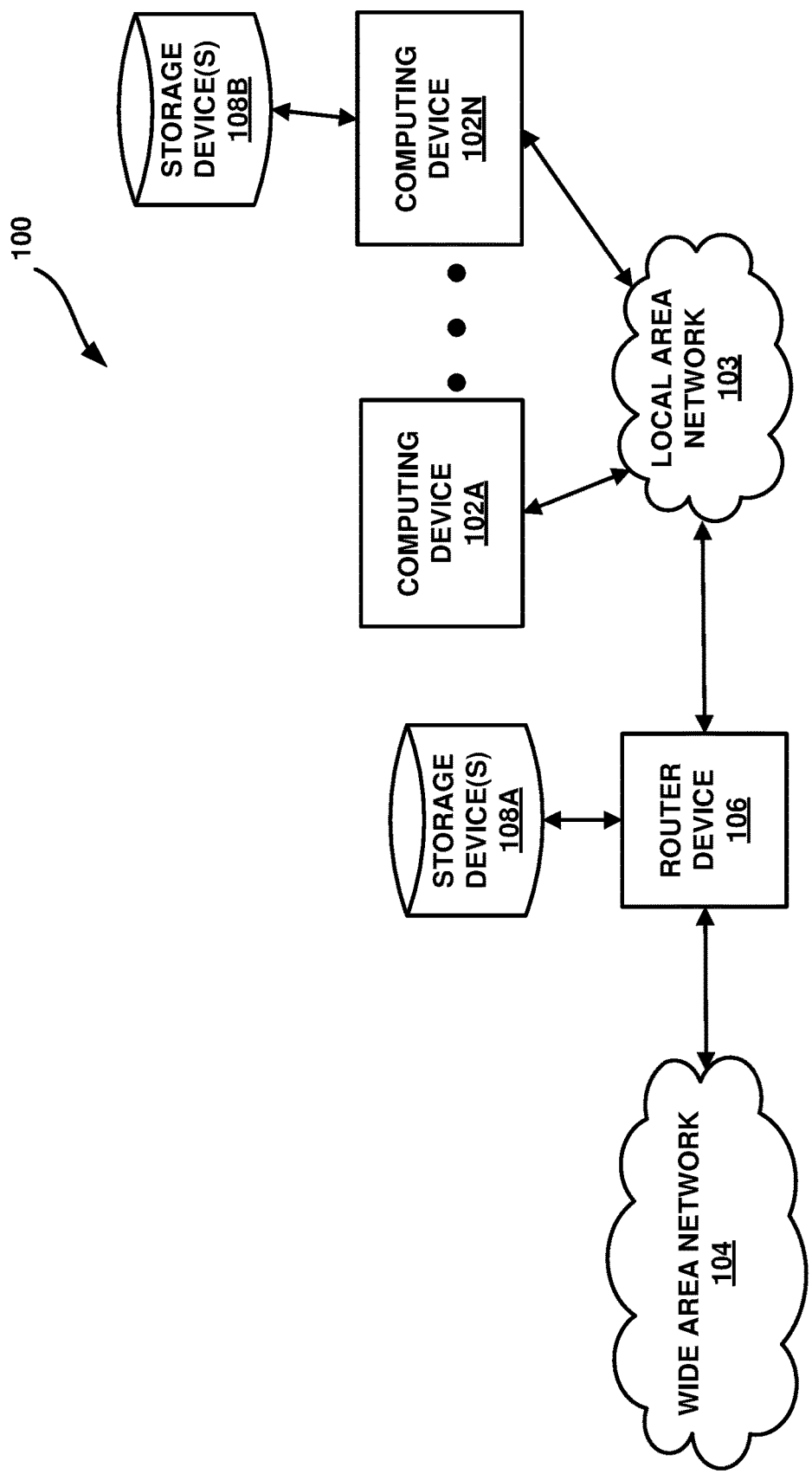
FIG. 1 is a block diagram illustrating an example of a system that may implement one or more techniques of this disclosure.

Devices configured for network communications may access digital data stored on network attached storage devices by utilizing an implementation of a communications network. An implementation of a communications network includes various layers of abstraction. An example of a reference model including example defined tasks for each layer of abstraction in a communications network includes the Open Systems Interconnection (OSI) model. The OSI model describes a 7-layer model, including an application layer, a presentation layer, a session layer, a transport layer, a network layer, a data link layer, and a physical layer. A physical layer may generally refer to a layer at which electrical signals form digital data. For example, a physical layer may define how modulated radio frequency (RF) symbols form a frame of digital data. A data link layer, which may also be referred to as link layer, may generally refer to an abstraction used prior to physical layer transmission/reception. It should be noted that a during an established two-way communications session, the logical roles of a client and a server may be respectively assigned to each device, where a file is stored at a server and a client reads/writes to the file. A network layer may generally refer to a layer at which logical addressing occurs. That is, a network layer may generally provide addressing information (e.g., Internet Protocol (IP) addresses) such that data packets can be delivered to a particular node (e.g., a computing device) connected to a communications network. That is, a client device and a server device may be assigned respective unique network addresses. Generally, the collective function of a session layer, a presentation layer, and an application layer is to cause data delivered to a particular node to be utilized by the appropriate process operating on the particular node. For example, each of a session layer, a presentation layer, and an application layer may cause received data including, for example, video data to be rendered for presentation in a web browser running on a client device. The function of the transport layer may be described as regulating the transport of data between the sending application and the receiving application. That is, for example, a transport layer establishes a unique logical connection between a sending application running on a sending device and a receiving application running on a receiving device. A unique logical connection includes a corresponding logical endpoints at each of the corresponding devices. In this manner, a transport layer enables multiple logical connections between a server device and a client device. Examples of endpoints include ports which may be identified by a combination of a network address (e.g., an IP address) and a port number. Port numbers may be specified according to a defined transport layer protocol.

One example implementation of a communications network includes the utilization of Server Message Block (SMB) protocols operating on top of a supported transport layer. SMB protocols provide a mechanism for providing shared access to files and printers, typically, over a local area network (LAN). That is, for example, in the case of a network attached storage device, a client device may read data from or write data to a file hosted on the network attached storage device by utilizing SMB protocols. As used herein, the term Server Message Block (SMB) protocols may include Server Message Block (SMB) Version 1 Protocol, Server Message Block (SMB) Versions 2 and 3 Protocols, and various dialects thereof, including, for example, the Common Internet File System (CIFS) Protocol. It should be noted that the Common Internet File System (CIFS) Protocol may be described as a dialect of Server Message Block (SMB) Version 1 Protocol and Server Message Block (SMB) Version 1 Protocol may be described as an extension of the Common Internet File System (CIFS) Protocol. Server Message Block (SMB) Version 1 Protocol is described in Microsoft Corporation, "Server Message Block (SMB) Protocol," [MS-SMB]-v20171201, Release: Dec. 1, 2017; Server Message Block (SMB) Versions 2 and 3 Protocols are described in Microsoft Corporation, "Server Message Block (SMB) Protocol Versions 2 and 3," [MS-SMB2]-v20171201, Release: Dec. 1, 2017; and Common Internet File System (CIFS) Protocol is described in Microsoft Corporation, "Common Internet File System (CIFS) Protocol," [MS-CIFS]-v20171201, Release: Dec. 1, 2017, each of which are respectively incorporated by reference herein.

In SMB protocols, communication is facilitated through requests and responses. That is, in the typical case, once a session is established, in order to access a file, a client sends a request message for creation or access to a file runtime object and a server will send a response message indicating that the file runtime object has been created or was open. A client then sends a read/write file request message and a server will send a read/write file response message. SMB protocols may be implemented as operating on top one of the following transports: the Direct Transmission Control Protocol (TCP), i.e., directly over TCP using port 445; the NetBIOS (Network Basic Input/Output System) application programming interface (API); and the SMB2 remote direct memory access (RDMA) model. In the Direct TCP configuration, a four byte header that specifies the size of the packet that follows the four byte header is utilized. Further, in the NetBIOS configuration, a four byte header that specifies the size of the packet that follows the four byte header is utilized, where a few bits in the header have a different meaning than corresponding bits in the Direct TCP header, and thus, the maximum packet size is allowed in the NetBIOS configuration is smaller than that in the Direct TCP configuration.

As described above, a transport layer establishes a unique logical connection between a sending application running on a device and a receiving application running on a device. In this manner, a sending application may write a transport layer packet to its logical end point and the device running the sending application may cause the transport layer packet to be sent via a network to the device running the receiving application. Further, the device running the receiving application may cause the transport layer packet to be stored to its corresponding logical endpoint and the receiving application may read the transport layer packet from its logical end point. In the case of SMB operation on top of the Direct TCP configuration or the NetBIOS configuration, transport layer processing includes writing the four byte header at the sending side and parsing the four byte header at the receiving side. Thus, in general an SMB packet may be encapsulated in a transport layer packet including a four byte header.

The manner in which a particular device implements transport layer processing is based on the particular hardware and software implementation of a device. For example, devices may run a so-called Unix-like operating system. An example of a Unix-like operation system may include an operating system utilizing an implementation of the Linux kernel, where a kernel may be described as a component of an operating system responsible for mediating access to a computer's resources (e.g., a processor). It should be noted that, for the sake of brevity, a complete discussion of the Linux kernel is not described in detail herein. However, reference is made to documentation maintained by the Linux Kernel Organization. The Linux kernel utilizes a data structure referred to as a socket buffer for implementing network communications. A socket buffer is a data structure used to represent packets sent/received over a network. Essentially, for a device running an implementation of the Linux kernel, a network packet is received from a network connection (i.e., on a wire) at a network interface controller (NIC). A network interface controller driver raises an interrupt causing the network packet to be stored to a socket buffer. The Linux kernel performs network layer processing (e.g., parsing network layer header) and transport layer processing (e.g., parsing the transport layer header) on the packet represented by the socket buffer. After network and transport layer processing, data encapsulated in the packet is passed up to an application for application layer processing. Similarly, during transmission, an application may cause data to be written to a socket buffer, a transport layer header and a network layer header are appended to the data in the socket buffer to form a representation of a network packet. The network interface controller driver causes a network packet to be generated and transmitted. A socket buffer consists of two parts packet data, i.e., data actually transmitted over a network and management data, i.e., implementation-specific data (pointers, timers, etc.).

The Linux kernel further includes a virtual filesystem that includes defined methods and data structures. The virtual filesystem serves as an abstraction that enables applications to interoperate with various defined file systems. The Virtual Filesystem (sometimes referred to as the Virtual File Switch) defined for the Linux Kernel includes the following data structures: a superblock object, an Mode object, a dentry object, and a file object. In Linux, an instance of a file object represents a file opened by a process (e.g., a system call associated with an application read). That is, a file object is the in-memory representation of an open file. Thus, in the case of the Linux kernel, in order to write data received over a network to a file, the data is read from a socket buffer and the data is transferred to an instance of a data structure in the VFS. There are several ways to read data from a socket buffer and transfer the data to the appropriate instance of a data structure in the VFS. It should be noted that the techniques described herein may be generally applicable to various network data structures and file system abstractions. For example, the techniques described herein are generally applicable when data received over a communications network is stored to an intermediate data structure, which may generally referred to as a network buffer, and transferred to a file system and/or file system abstraction, which may generally be referred to as a file system object. Further, it should be noted that as used herein the term virtual filesystem may be used to generally refer to an abstraction between an operating system (and/or application) and a third-party file system. For example, FUSE for Mac OS/Android/Linux and Windows filer drivers may be considered examples of virtual filesystems.

As described above, SMB protocols provide a mechanism for providing shared access to files. Thus, data encapsulated in an SMB packet may be include data to be written to a file represented by an object in a VFS. The techniques described herein, provide efficient ways to transfer data included in SMB message from a network buffer to a file system object.

FIG. 1 is block diagram illustrating an example of a system that may implement one or more techniques described in this disclosure. System 100 may be configured to enable a user to access data over a network in accordance with the techniques described herein. In the example illustrated in FIG. 1, system 100 includes one or more computing devices 102A-102N, local area network 103, wide area network 104, and router device 106. As further illustrated in FIG. 1, storage device(s) 110A may be operably coupled to router device 106 and storage device(s) 108B may be operably coupled to computing devices 102A-102N. System 100 may include software modules operating on one or more servers. Software modules may be stored in a memory and executed by a processor. Servers may include one or more processors and a plurality of internal and/or external memory devices.

Memory devices may include any type of device or storage medium capable of storing data. A storage medium may include tangible or non-transitory computer-readable media. Computer readable media may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. When the techniques described herein are implemented partially in software, a device may store instructions for the software in a suitable, non-transitory computer-readable medium and execute the instructions in hardware using one or more processors.

In the example illustrated in FIG. 1, computing devices 102A-102N may include any device configured to enable a user to cause data, such as, for example, documents, music, videos, images, to be transmitted to and/or received from local area network 103 and wide area network 104. For example, computing devices 102A-102N may be equipped for wired and/or wireless communications and may include set top boxes, digital video recorders, televisions, desktop, laptop, or tablet computers, gaming consoles, mobile devices, including, for example, smart phones, cellular telephones, and personal gaming devices.

Each of local area network 103 and wide area network 104 may comprise any combination of wireless and/or wired communication media. Each of local area network 103 and wide area network 104 may include coaxial cables, fiber optic cables, twisted pair cables, wireless transmitters and receivers, routers, switches, repeaters, base stations, or any other equipment that may be useful to facilitate communications between various devices and sites. Local area network 103 and wide area network 104 may be distinguished based on types of access. For example, wide area network 104 may include a network configured to enable access to the World Wide Web, for example, the Internet. Local area network 103 may be configured to enable a user to access a subset of devices (e.g., home devices and computing devices located within a user's home). Such access may be limited to a particular set of users based on a set of rules provided by a firewall. Local area network 103 may be referred to as a personal or home network. It should be noted that system 100 is described in examples herein in the context of home networking applications, the techniques described herein are generally application to any type of networking applications. That is, for example, the techniques described herein may be applicable to enterprise applications, e.g., an organization including multiple communications networks.

Each of local area network 103 and wide area network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of the IEEE 802 standards (e.g., Wi-Fi). Further, as described in further detail below, devices connected to local area network 103 may communicate by utilizing SMB protocols.

Referring again to FIG. 1, system 100 includes router device 106. Router device 106 may be configured to receive data from wide area network 104 and transmit data to a respective one of computing devices 102A-102N using local area network 103. In one example, router device 106 may include a so-called Wi-Fi router and, in one example, may be configured to receive data from a modem device (e.g., a cable modem) and wirelessly transmit data to one of computing devices 102A-102N. As illustrated in FIG. 1, storage device(s) 108A may be operably coupled to router device 106 and storage device(s) 108B may be operably coupled to computing device 102N. Storage device(s) 108A-108B may include a storage medium. As described above, a storage media may include optical discs, flash memory, magnetic memory, or any other suitable digital storage media. Storage device(s) 108A-108B may be internal or external memory and in some examples may include non-volatile storage elements. Storage device(s) 108A-108B may include memory cards (e.g., a Secure Digital (SD) memory card, including Standard-Capacity (SDSC), High-Capacity (SDHC), and eXtended-Capacity (SDXC) formats), internal/external hard disk drives, and/or internal/external solid state drives. Data stored on storage device(s) 108A-108B may be stored according to a defined file system, such as, for example, FAT, exFAT, NFTS, HFS+, and/or EXT4 files systems. In the example where storage device(s) include memory cards or external hard disk drives, devices may be configured to receive a memory card (e.g., an SD memory card) or a disk drive (e.g., through a USB port). When operably coupled to router 106, a storage device 108A may be accessible by one or more of computing devices 102A-102N and may be referred to as a network attached storage (NAS) device or a local media server. It should be noted that there may be other ways to implement a network attached storage device. It should be noted that the techniques described herein are not limited to a particular physical implementation of a network attached storage device. As described in further detail below, in one example, each of router 106 and computing devices 102A-102N may be configured to share files by utilizing SMB protocols.

Figure 2:
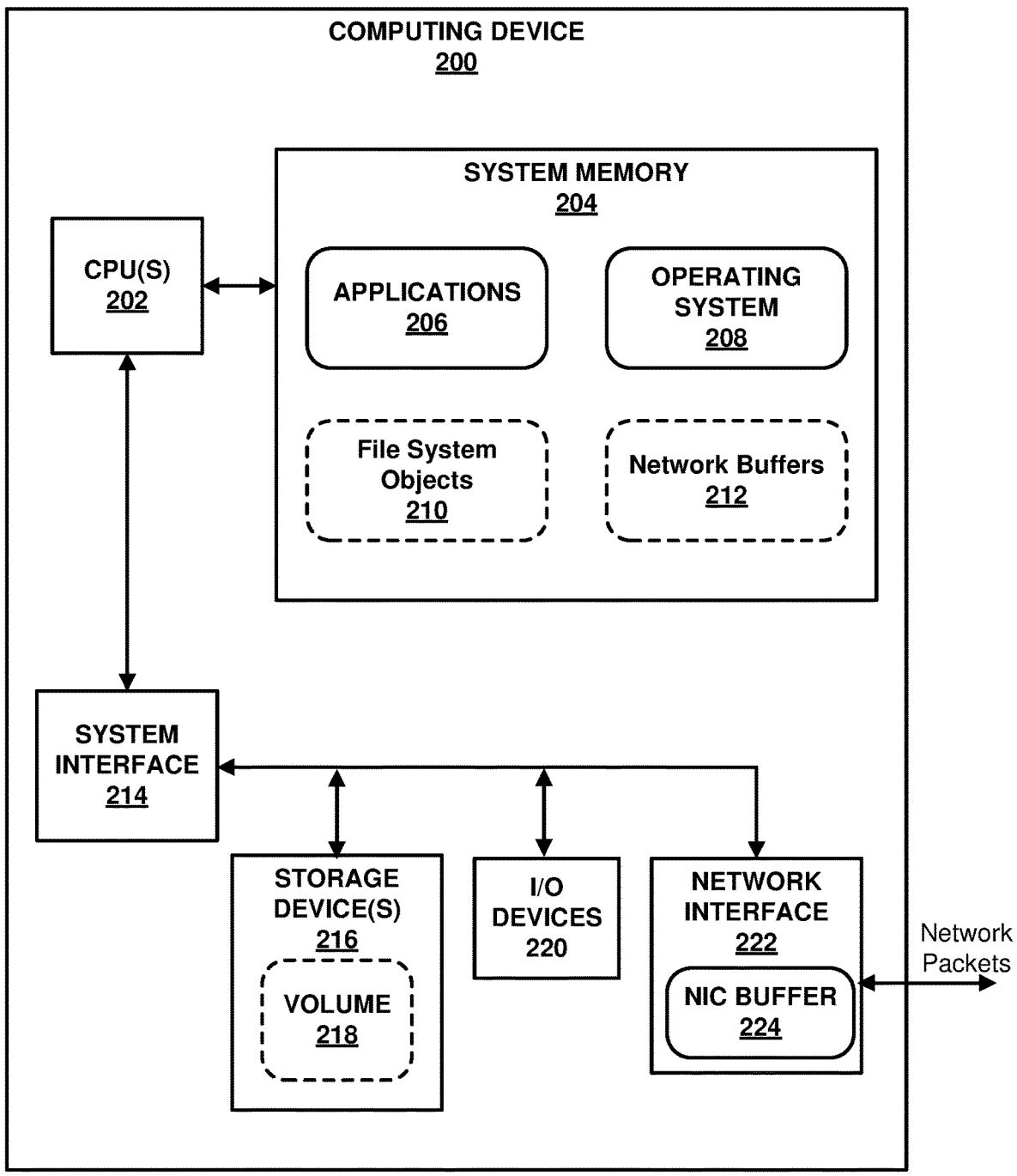
FIG. 2 is a block diagram illustrating an example of a computing device that may implement one or more techniques of this disclosure.

FIG. 2 is a block diagram illustrating an example of a computing device that may implement one or more techniques of this disclosure. Computing device 200 is an example a computing device configured to store data on or retrieve data from a computer readable medium. Data may include, for example, application files, document files, media files (audio and/or video files), and the like. Computing device 200 may include one or more processors and a plurality of internal and/or external storage devices. Computing device 200 may be an example of a device configured send/receive data using a network, e.g., local area network 103 and/or wide area network 104. Computing device 200 may be equipped for wired and/or wireless communications and may include devices, such as, for example, desktop or laptop computers, mobile devices, smartphones, cellular telephones, tablet devices, set top boxes, personal gaming devices, a router device, and automotive infotainment systems. Computing device 200 may represent an example implementation of a computing devices 102A-102N and router device 106 illustrated in FIG. 1. Thus, computing device 200 may represent an example of a network attached storage device or a device accessing data from a network attached storage device.

As illustrated in FIG. 2, computing device 200 includes central processing units(s) 202, system memory 204, system interface(s) 214, storage device(s) 216, I/O device(s) 220, and network interface 222. It should be noted that although example computing device 200 is illustrated as having distinct functional blocks, such an illustration is for descriptive purposes and does not limit computing device 200 to a particular hardware or software architecture. Functions of computing device 200 may be realized using any combination of hardware, firmware and/or software implementations. Central processing units(s) 202, which may also be described generally as a processor configured to implement functionality and/or process instructions for execution in computing device 200. Central processing units(s) 202 may be capable of retrieving and processing instructions, code, and/or data structures for implementing one or more of the techniques described herein. Instructions may be stored on a computer readable medium, such as system memory 204 or storage devices 216. Central processing units(s) 202 may include digital signal processors (DSPs), general purpose microprocessors, application specific integrated circuits (ASICs), field programmable logic arrays (FPGAs), or other equivalent integrated or discrete logic circuitry. Central processing units(s) 202 may include one or more multi-core central processing units. A core may be an independent central processing unit (CPU) capable of retrieving and processing instructions, code, and/or data structures. In one example, a processor may include two or up to 64 cores. Central processing unit(s) 202 may operate according to a page size, where a page includes a fixed-length contiguous block of virtual memory. A common page size for central processing unit architectures is 4096 bytes (i.e., 4 kilobytes (kiB)). Other example page sizes may include 8 kiB, 16 kiB, 32 kiB, 64 kiB, etc.

System memory 204 may be configured to store information that may be used by computing device 200 during operation. System memory 204 may be described as a non-transitory or tangible computer-readable storage medium. In some examples, system memory 204 may provide temporary memory and/or long-term storage. In some examples, system memory 204 or portions thereof may be described as non-volatile memory and in other examples portions of system memory may be described as volatile memory. In one example, system memory 204 may include non-volatile memory storing a Basic Input/Output System (BIOS) for computing device. In one example, system memory 204 may include random access memory (RAM) storing pages. In one example, system memory 204 may include an internal hard disk drive and/or an internal flash memory.

In the example illustrated in FIG. 2, system memory 204 is illustrated as including application 206, operating system 208, file system objects 210, and network buffers 212. Applications 206 may include any applications implemented within or executed by computing device 200 and may be implemented or contained within, operable by, executed by, and/or be operatively/communicatively coupled to components of computing device 200. Applications 206 may include user applications including instructions that may cause central processing units 202 of computing device 200 to perform particular functions. For example, applications 206 may include media playback applications. Applications 206 may receive data from a network and may cause data to be transmitted to a network. Applications 206 may include algorithms which are expressed in computer programming statements, such as, for loops, while-loops, if-statements, do-loops, etc. It should be noted that with respect to the Linux kernel, the term user space, refers to processes that operate outside of the kernel, and typically include used applications. Operating system 208 may be configured to facilitate the interaction of applications with processor 202, and other hardware components of computing device 200. Operating system 208 may be an operating system designed to be installed on laptops and desktops. For example, operating system 208 may be a Windows® operating system, Linux, or Mac OS. Operating system 208 may be an operating system designed to be installed on laptops, desktops, smartphones, tablets, set-top boxes, and/or gaming devices. For example, operating system 208 may be a Windows®, Linux, Mac OS, Android, iOS, Windows Mobile®, or a Windows Phone® operating system. Operating system 208 may include an implementation of the Linux kernel and various drivers. It should be noted that the techniques described herein are not limited to a particular operating system or software architecture.

As further illustrated in FIG. 2, system memory 204 includes file system objects 210 and network buffers 212. As described above, the Linux kernel includes a virtual filesystem that includes defined methods and data structures. File system objects 210 represent instances of file system objects, including virtual filesystems objects stored to system memory 204. As described above, in Linux, a socket buffer is a data structure used to represent packets sent/received over a network and includes data actually transmitted over a network and management data. Network buffers 212 represent an instance of packets sent/received over a network stored to system memory 204 and may include, e.g., socket buffers. As described in further detail below, computing device 200 may be configured to transfer data included in network buffers 212 to file system objects 210 according to one or more of the techniques described herein.

Referring again to FIG. 2, system interface(s) 214 may be configured to enable communication between components of computing device 200. In one example, system interface 214 comprises structures that enable data to be transferred from one peer device to another peer device or to a storage medium. For example, system interface 214 may include a chipset supporting PCI and PCIe bus protocols, proprietary bus protocols, Universal Serial Bus (USB) protocols, I²C, or any other logical and physical structure that may be used to interconnect peer devices. In one example, network interface 222 may be operably coupled to computing device 200 using a PCIe bus. Storage device(s) 216 represents memory devices of computing device 200 that may be configured to store different amounts of information for different periods of time than system memory 204. Similar to system memory 204, storage device(s) 216 may also include one or more non-transitory or tangible computer-readable storage media. Storage device(s) 220 may be internal or external memory and in some examples may include non-volatile storage elements. As illustrated in FIG. 2, storage device 216 is illustrated as including a volume 218. Volume 218 represents an instance of data stored to storage device according to a defined file system. I/O device(s) 220 may be configured to receive input from and provide output to a user of computing device 200. Input may be generated from an input device, such as, for example, a touch-sensitive screen, a track pad, a joystick, a mouse, a keyboard, a microphone, a video camera, or any other type of device configured to receive input. Output may be provided to output devices, such as, for example speakers or a display device. In some examples, I/O device(s) 220 may be external to computing device 200 and may be operatively coupled to computing device 200 using a standardized communication protocol, such as for example, USB or High-Definition Media interface (HDMI).

Network interface 222 may be configured to enable computing device 200 to communicate with external computing devices via one or more networks. For example, network interface controller 222 may be configured to enable a computing device to communicate with other computing devices connected to local area network 103 and/or wide area network 104. Network interface 222 may be included as part of a network interface card, such as an Ethernet card, and may include an optical transceiver, a radio frequency transceiver, or any other type of device that can send and receive information. In one example, network interface 222 is configured to receive an Ethernet frame on a wire. As illustrated in FIG. 2, network interface 222 includes network interface controller buffer 224. As described above, for a device running an implementation of the Linux kernel, a network packet is received from a network connection (i.e., on a wire) at a network interface controller. The network packet may be stored to network interface controller buffer 224. Thus, network interface controller buffer 224 may be configured to store frames received from a network and frames to be sent on a network. Network interface 222 raises an interrupt causing the network packet stored in NIC buffer 224 to be stored to network buffers 212. As described above, in order to write data received over a network to a file, the data stored as a network buffer is transferred to a file system object, for example data included in a socket buffer is transferred to an object in the VFS. Computing device 200 may be configured to transfer data stored as a network buffer to a file system object according to the techniques described herein. That is, computing device 200 may be configured to process a server message block protocol message encapsulated in a transport packet as described in further detail below.

Figure 3:
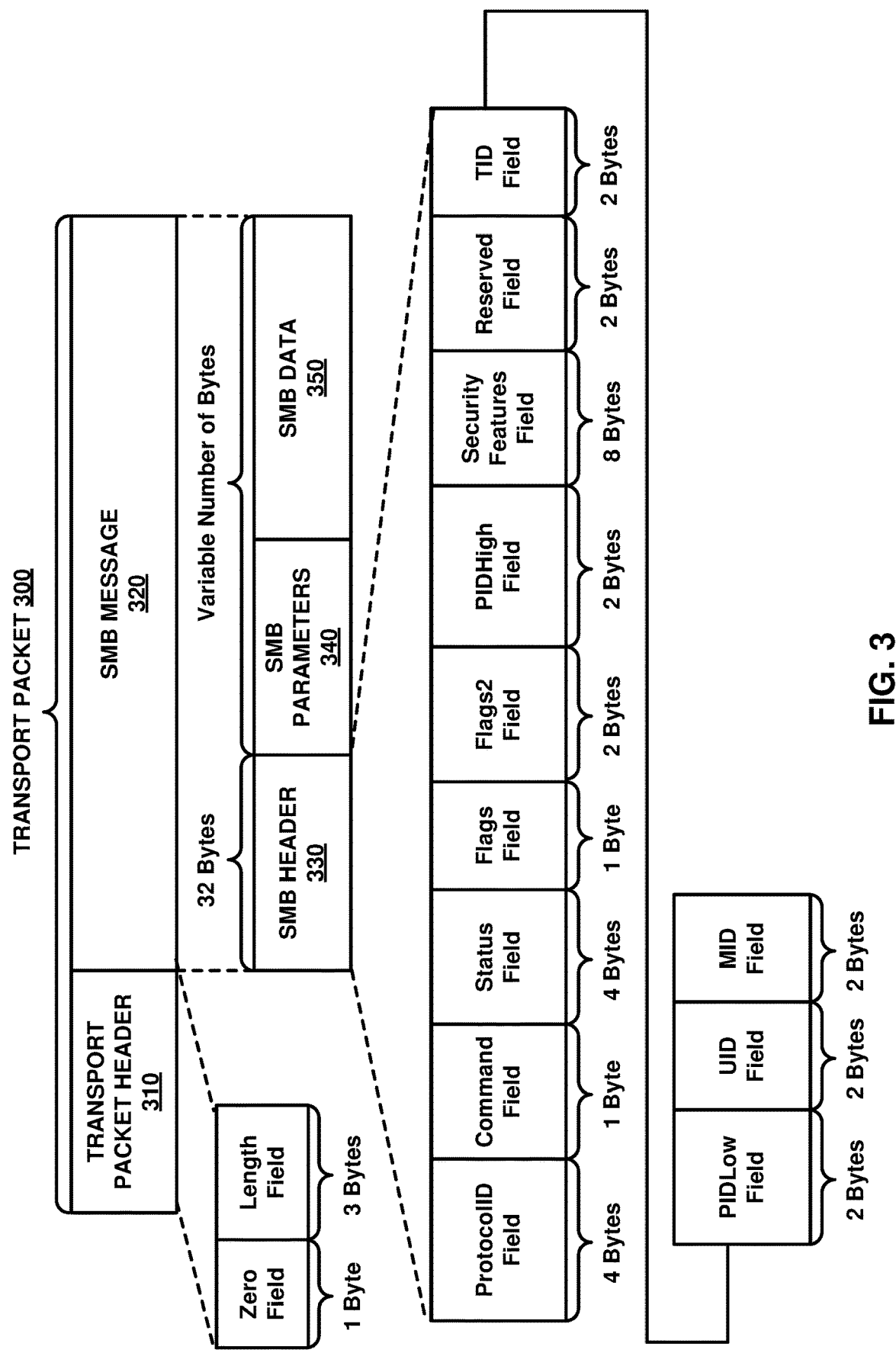
FIG. 3 is a conceptual diagram illustrating an example of transport packet encapsulating a server message block protocol message in accordance with one or more techniques of this disclosure.
Figure 4:
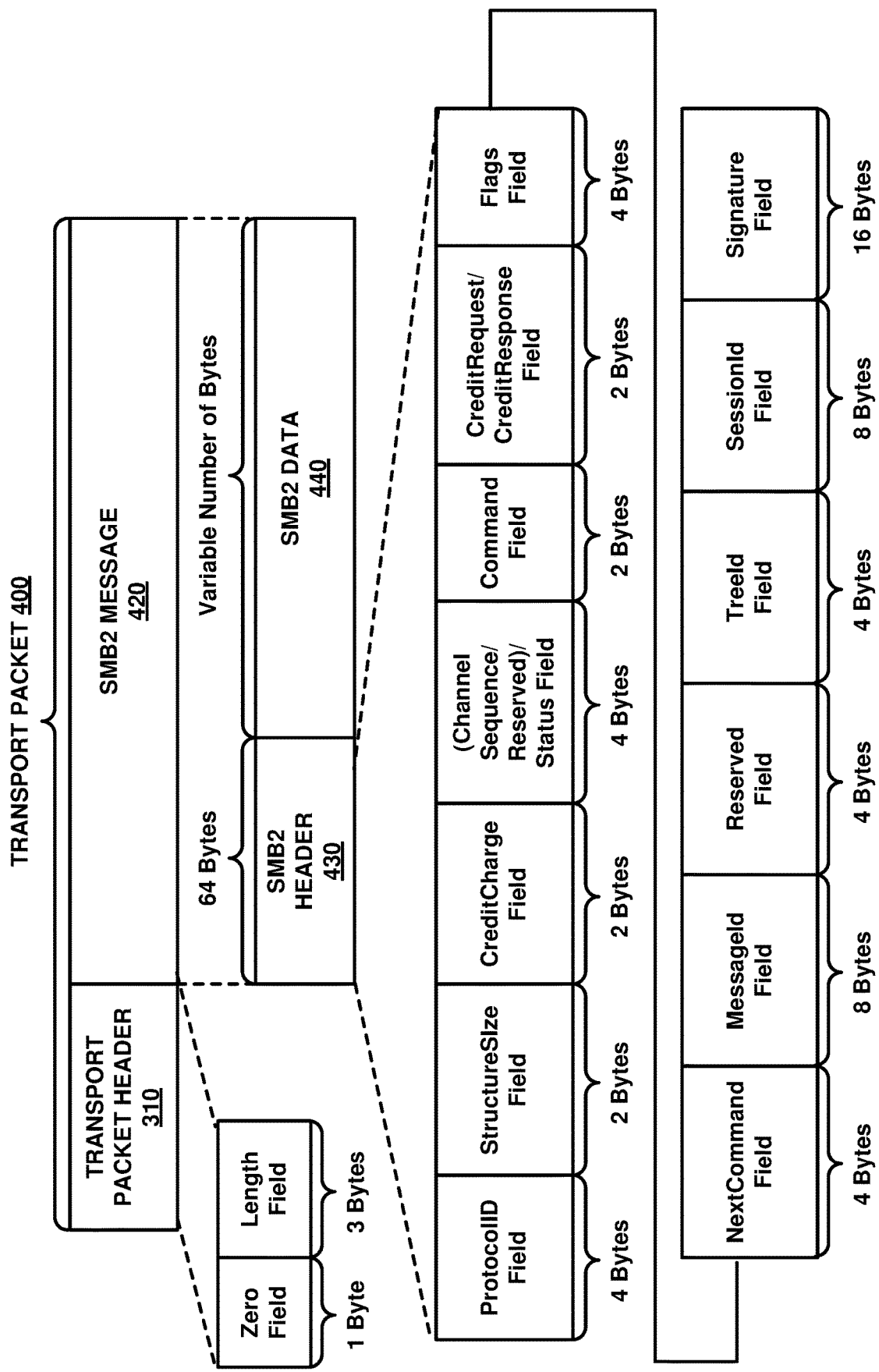
FIG. 4 is a conceptual diagram illustrating an example of a transport packet encapsulating a server message block protocol message in accordance with one or more techniques of this disclosure.

FIG. 3 and FIG. 4 are conceptual diagrams illustrating examples of a transport packet encapsulating a server message block protocol message in accordance with one or more techniques of this disclosure. The example illustrated in FIG. 3 corresponds to an example where an SMB protocol message includes a message based on CIFS. The example illustrated in FIG. 4 corresponds to an example where an SMB protocol message includes a message based on SMB Version 2 or 3. With respect to FIG. 4, it should be noted that SMB Version 2 or 3 also includes a variation of the SMB2 packet header that is used for a response to a request processed asynchronously by a server. However, similar to the SMB2 packet header illustrated in FIG. 4, the variation of the SMB2 Packet Header includes the command field at bytes 13 and 14 and for the sake brevity, the variation will not be described herein. As described above, in general, an SMB packet may be encapsulated in a transport layer packet including a four byte header where the four byte header indicates the length of the message following the transport packet header.

As illustrated in FIG. 3 and FIG. 4, transport packet 300 and transport packet 400 include transport packet header 310. Transport packet header 310 includes a one byte zero field and a three byte length field. Transport packet header 310 may correspond to a Direct TCP header or a NetBios header. In the case of the Direct TCP header, the zero field includes a zero byte (0x00) and the three byte length field specifies the length of the enclosed SMB message in bytes. Thus, based on the three byte length field, in Direct TCP, the maximum length of the SMB message is 16,777,215 bytes. As illustrated in FIG. 3 and FIG. 4, each of SMB message 320 and SMB message 420 include fields forming an SMB packet header. Referring to FIG. 3, the ProtocolID Field is a four-byte literal string identifying an SMB protocol; the Command Field is a one-byte command code, the Status Field is a 32-bit field used to communicate error messages from the server to the client; Flags Field is an eight-bit field of one-bit flags describing various features in effect for the message; Flags2 Field is a 16-bit field of one-bit flags that represent various features in effect for the message; PIDHigh Field is a two-byte field representing the high-order bytes of a process identifier (PID); Security Features Field is an eight-byte field either used to include an encryption key or is reserved; Reserved Field is a two-byte field set to zero, TID Field is a two-byte tree identifier; PIDLow Field is a two-byte field representing the low-order bytes of a process identifier (PID); UID Field is a two-byte user identifier; and MID Field is a two byte multiplex identifier.

Referring to FIG. 4, the ProtocolID Field is a four-byte literal string identifying an SMB protocol; the StructureSize Field a four-byte field set to 64 indicating the size of the SMB2 header in bytes, CreditCharge Field is a two-byte indicating the number of credits that a request consumes or is reserved; (Channel Sequence/Reserved)/Status Field is a four-byte field interpreted as a channel sequence or a status; Command Field is a two-byte command code; CreditRequest/CreditResponse field is a two-byte field that on a request, indicates the number of credits the client is requesting and on a response, it indicates the number of credits granted to the client; Flags Field is a four-byte field indicating how to process an operation; NextCommand Field is a four-byte filed that is set to an offset for a compounded request; MessageId Field is an eight-byte field that identifies a message request and response uniquely across all messages that are sent on the same SMB 2 Protocol transport connection; Reserved Field is a two-byte field set to zero; TreeID Field is a four-byte field uniquely identifying a tree connect; SessionID Field is an eight-byte field Uniquely identifies the established session for the command; and Signature Field is a 16-byte signature of the message.

As described above, in SMB protocols, communication is facilitated through requests and responses and as illustrated in FIG. 3 and FIG. 4, each of SMB message 320 and SMB message 420 include a command field indicating a command code for the SMB message. Each of SMB message 320 and SMB message 420 include read and write command codes that may be used for a read request or response and a write request or response. Table 1 includes the values for the read and write commands in SMB2. It should be noted that there are various other command codes in SMB protocols, for example command codes for negotiating a session, that for the sake of brevity, are not described herein.

TABLE 1

| Name | Value |
| --- | --- |
| SMB2 READ | 0x0008 |
| SMB2 WRITE | 0x0009 |

As illustrated in FIG. 3, SMB message 340 includes SMB Parameters 340. SMB parameters 340 contains command dependent parameters. Thus, SMB header 330 and SMB parameters 340 and SMB2 430 header indicate commands including, but not limited to, one of: a read request, a read respond, a write request, or a write response. As further illustrated in FIGS. 3 and 4, each of SMB message 320 and SMB message 420 include respective SMB data payloads SMB Data 350 and SMB2 Data 440. Each of SMB Data 350 and SMB2 Data 440 include data corresponding to a command (e.g., a buffer including file data). Thus, in order to process one of a read request, a read respond, a write request, and a write response, in an SMB protocol message, a computing device needs to parse fields of SMB message header to determine if a SMB protocol message includes one of a read request, a read respond, a write request, and a write response. Further, each of a read request, a read respond, a write request, and a write response includes a particular data format for respective SMB data 350 and SMB2 data 440.

Figure 5:
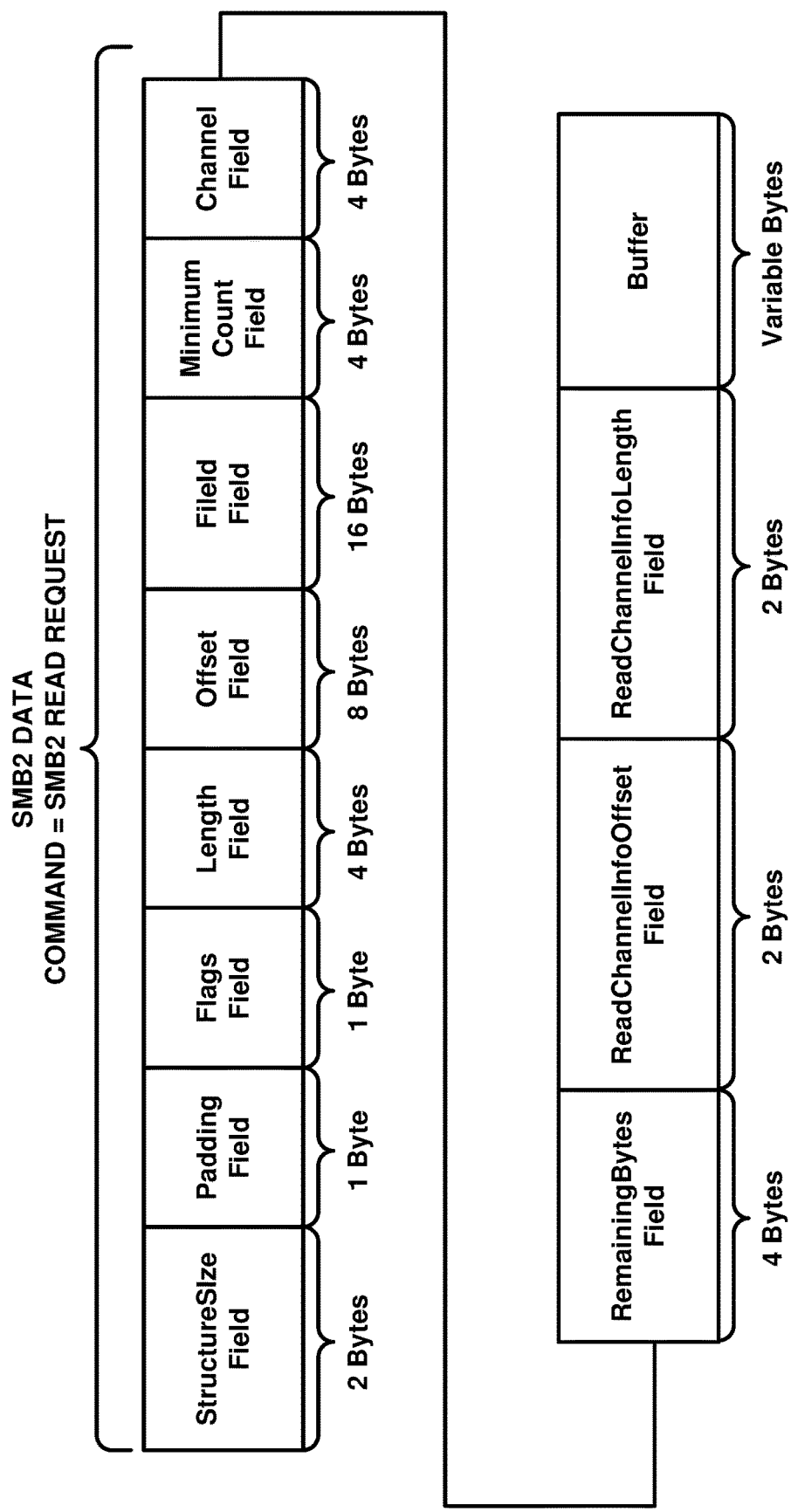
FIG. 5 is a conceptual diagram illustrating an example of a server message block protocol message in accordance with one or more techniques of this disclosure.
Figure 6:
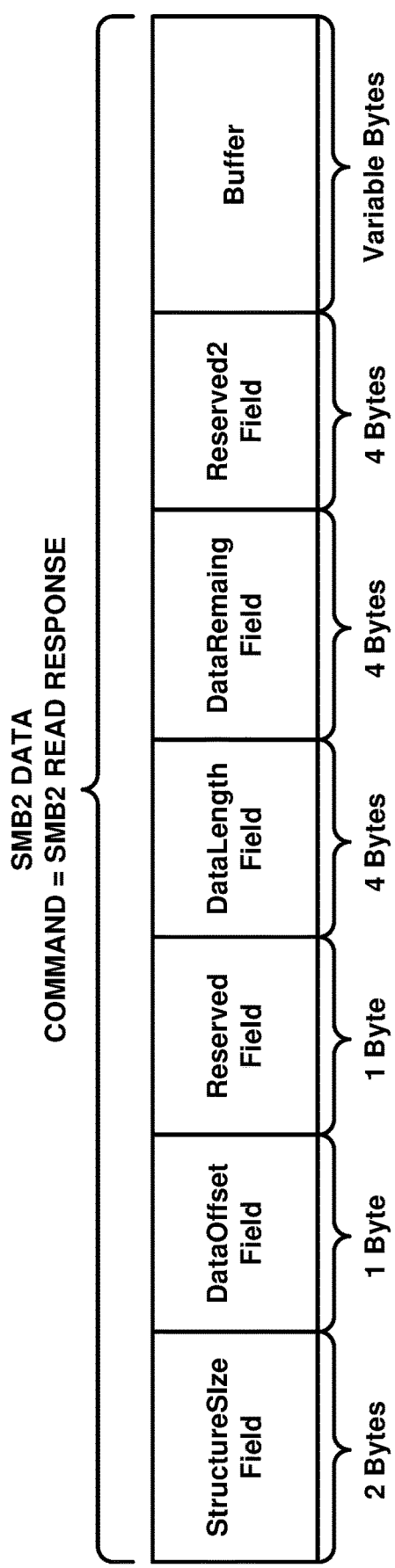
FIG. 6 is a conceptual diagram illustrating an example of a server message block protocol message in accordance with one or more techniques of this disclosure.
Figure 7:
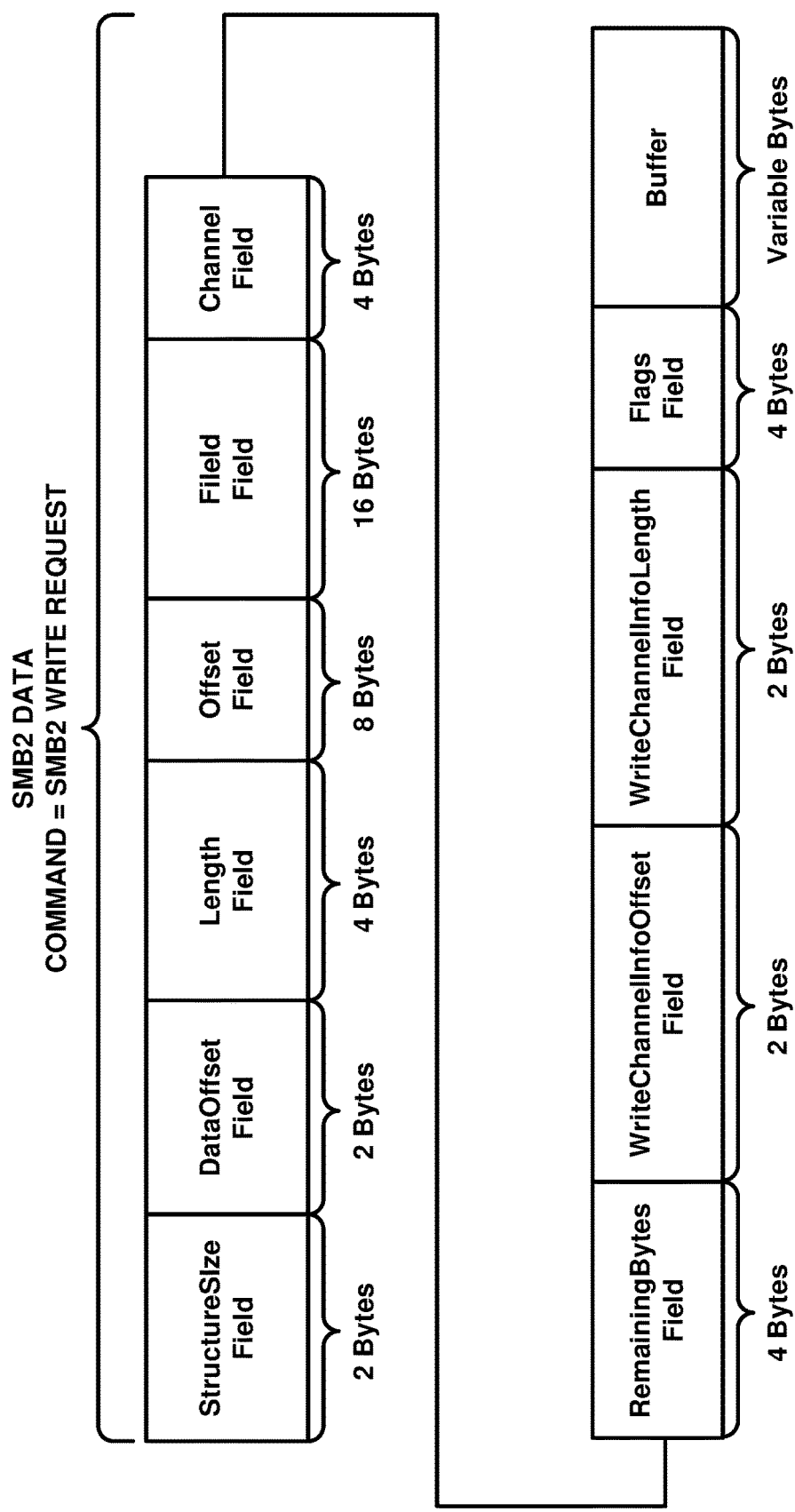
FIG. 7 is a conceptual diagram illustrating an example of a server message block protocol message in accordance with one or more techniques of this disclosure.
Figure 8:
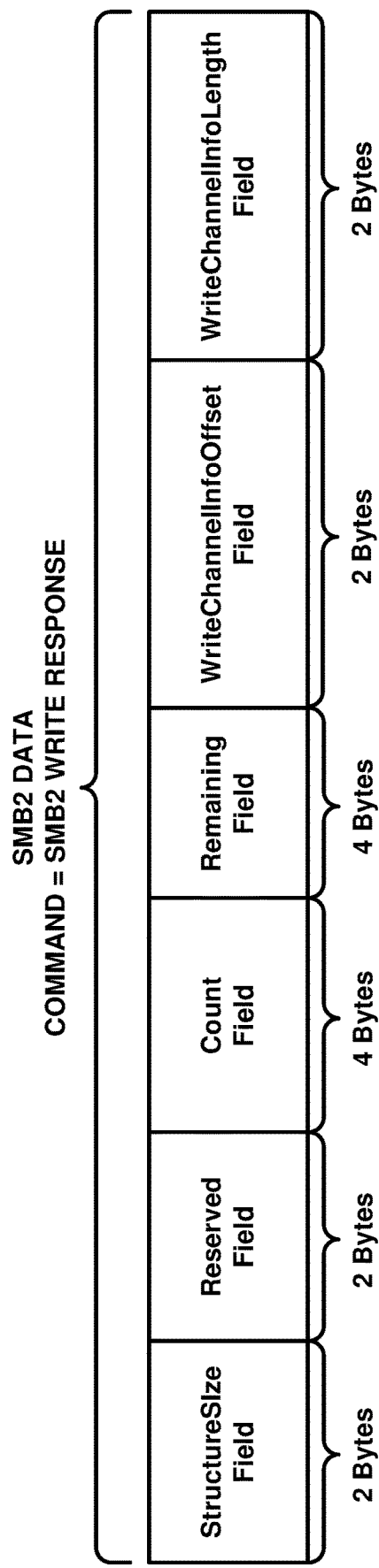
FIG. 8 is a conceptual diagram illustrating an example of a server message block protocol message in accordance with one or more techniques of this disclosure.

FIG. 5 provides the format of data for a read request in an SMB protocol message based on SMB Version 2 or 3. FIG. 6 provides the format of data for a read respond in an SMB protocol message based on SMB Version 2 or 3. FIG. 7 provides the format of data for a write request in an SMB protocol message based on SMB Version 2 or 3. FIG. 8 provides the format of data for a write respond in an SMB protocol message based on SMB Version 2 or 3. It should be noted that for the sake of brevity, descriptions of the format of data for a write request, a write response, a read request, and a read response in an SMB protocol message based on SMB Version 1 or CIFS are not provided herein. However, reference is made to documents describing SMB Version 1 and CIFS, which are incorporated by reference herein.

Referring to FIG. 5, in a read request, StructureSize Field is a two-byte field set to 49, indicating the size of the request structure; Padding Field is a one-byte field indicating the requested offset from the start of the SMB2 header, in bytes at which to place the data read in the read response; Flags Field is a one-byte, typically, set to zero, Length Field in a four-byte field indicating the length in bytes of the data to read from the specified file; Offset Field is an eight-byte field indicating the offset in bytes into the file which the data must be read; FileID Field is a 16-byte field indicating an identifier of the file on which to perform the read; MinimumCount Field is a four-byte field indicating the minimum number of bytes to read for the operation to be successful; Channel Field is a four-byte field, typically, set to zero; RemainingBytes Field is a four-byte field indicating the number of subsequent bytes that the client intends to read from the file after the operation completes; ReadChannelInfoOffset Field is a two-byte field that is either reserved or indicates the offset in bytes from the SMB2 header to channel data; ReadChannelInfoLength Field is a two-byte field that is either reserved or indicates the length in bytes of channel data; and Buffer is a variable length buffer that contains the read channel information, but is currently unused. Referring to FIG. 6, in a read response, StructureSize Field is a two-byte field set to 17, indicating the size of the response structure; DataOffset Field is a one-byte field, indicating the offset in bytes from the beginning of the header to the data read being returned in the response; Reserve Field is a one-byte reserved field set to zero; DataLength Field is a four-byte field indicating the length in bytes of the data read being returned in the response; DataRemaining Field is a four-byte field indicating the length in bytes of the data being sent on the channel specified in the request; Reserved2 Field is a one-byte reserved field set to zero; and Buffer is variable-length buffer that contains the data read for the response, as described by DataOffset and DataLength. The minimum length is 1 byte.

Referring to FIG. 7, in a write request, StructureSize Field is a two-byte field set to 49, indicating the size of the request structure; DataOffset Field is a two-byte field indicating the offset in bytes from the beginning of the header to the data being written; Length Field in a four-byte field indicating the length in bytes of the data being written; Offset Field is an eight-byte field indicating the offset in bytes of where to write the data in the destination file; FileID Field is a 16-byte field indicating an identifier of the file on which to perform the write; Channel Field is a four-byte field, typically, set to zero; RemainingBytes Field is a four-byte field indicating the number of subsequent bytes that the client intends to write to the file after this operation completes; WriteChannelInfoOffset Field is a two-byte field that is either reserved or indicates the offset in bytes from the SMB2 header to channel data; WriteChannelInfoLength Field is a two-byte field that is either reserved or indicates the length in bytes of channel data; Flags Field is a four-byte field indicating how to process the operation; and Buffer is a variable length buffer that contains the data to write to and the write channel information as described by DataOffset, Length, WriteChannelInfoOffset, and WriteChannelInfoLength. Thus, with respect to a write request, the first 48 bytes of a SMB2 data may be referred to as a write header. Referring to FIG. 8, in a write response, StructureSize Field is a two-byte field set to 17, indicating the size of the response structure; Reserve Field is a two-byte reserved field set to zero; Count Field is a four byte field indicating the number of bytes written; Remaining Field is a four-byte field which is reserved and set to zero; WriteChannelInfoOffset Field is a two-byte field which is reserved and set to zero; and WriteChannelInfoLength Field is a two-byte field which is reserved and set to zero.

As described above, for SMB protocols, in the typical case, once a session is established, in order to access a file, a client sends a request message for creation or access to a file and a server will send a response message indicating that the file has been created or was open. A client then sends a read/write file request message and a server will send a read/write file response message. In each of the read request in FIG. 5 and the write request in FIG. 7, the value of FileID field is the unique identifier used to identify the file object. Further, in the read response in FIG. 6, the values of DataOffset Field and DataLength field provide the offset from the SMB2 header and the length of the read data being returned in the response, i.e., DataOffset Field and DataLength describe the data included in buffer. Further, in the write request in FIG. 7, DataOffset field and Length field provide the offset from the SMB2 header and the length of the data request data to be written, i.e., DataOffset Field and DataLength describe the data included in buffer. It should be noted that in some cases, in the write request in FIG. 7, WriteChannelInfoOffset and WriteChannelInfoLength may further describe the data.

As described above, in order to write data received over a network to a file, received data stored to a network buffer is transferred to an instance of a file system object. In some cases, transport layer processing may include simply reading the four byte transport layer header from a network buffer by invoking a first read call to determine the length of an SMB protocol message. SMB protocol message processing may include reading the SMB protocol message from a network buffer by invoking a second read call according to the indicated length. From the read SMB protocol message, the SMB protocol message header may be parsed and the SMB protocol message command may be determined. It should be noted that in the case of the write request command, in the typical case, SMB protocol message processing includes performing a subsequent read of the SMB Protocol message to extract the file data and copy the file data to a file system object. Thus, in a typical implementation, in order to cause file data in an SMB protocol message to be written to a corresponding file system object, data is read from the network buffer three times. Reading data from a network buffer multiple tines may be less than ideal, particularly in the case where the data in buffer is relatively large. Further, as described above, transport layer processing includes regulating the transport of data between the sending application and the receiving application and may include processing various types of transport layer protocols. Thus, implementing complete SMB protocol message processing in transport layer processing is less than ideal.

Figure 9A:
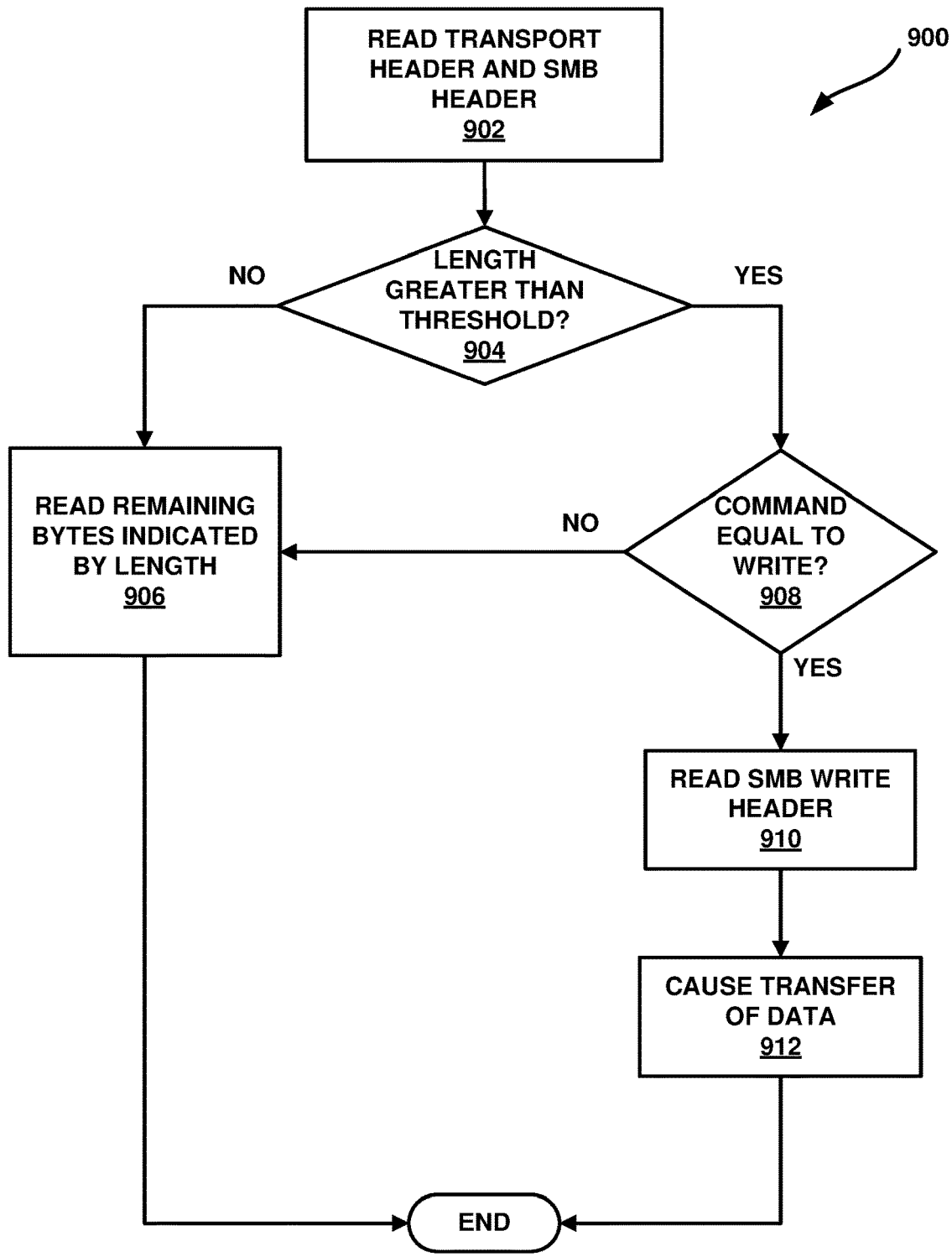
FIGS. 9A-9B are flowcharts illustrating an example of transport layer processing of a server message block protocol message according to one or more techniques of this disclosure.
Figure 9B:
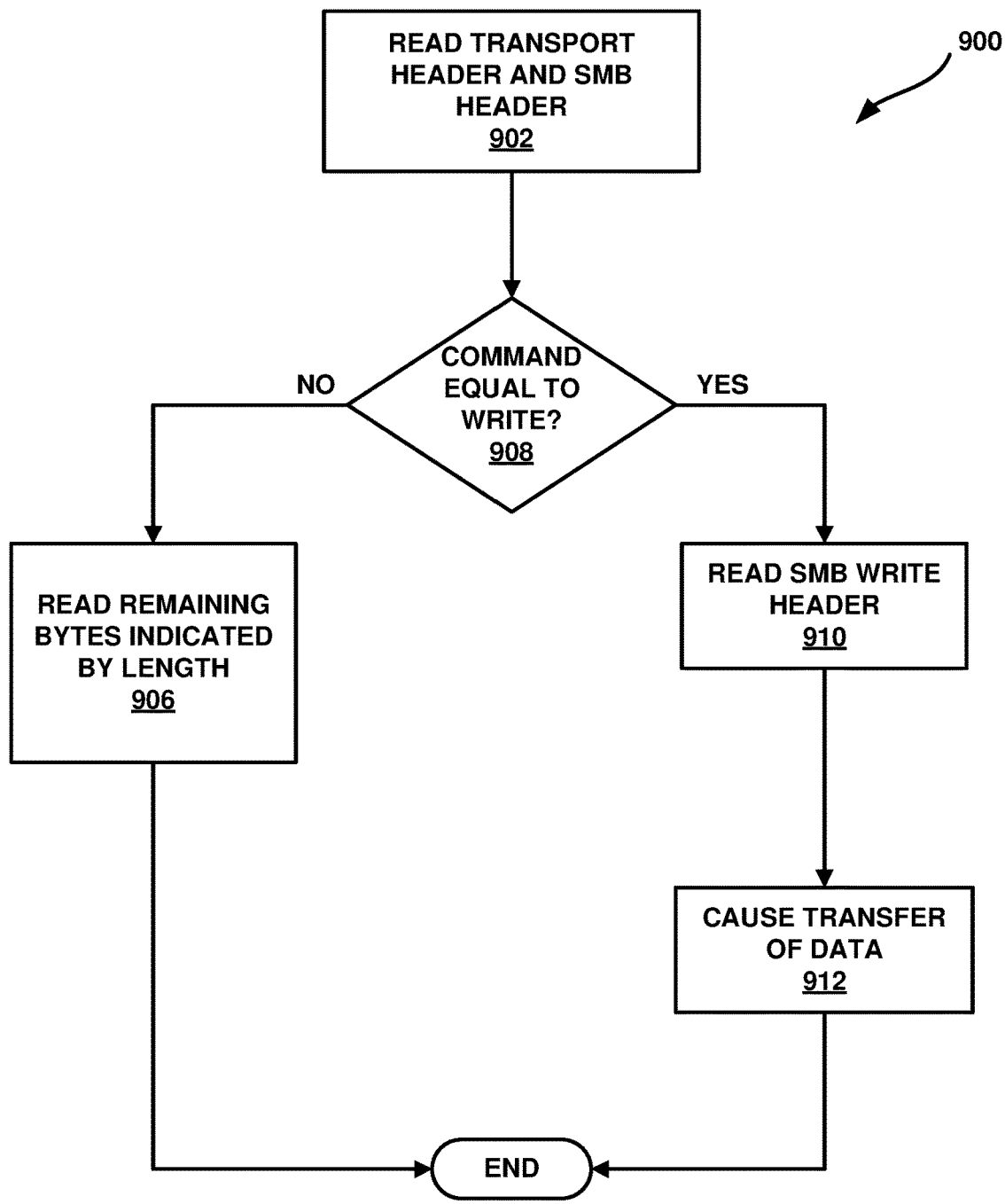

According to the techniques described herein computing device 200 may be configured such that the implementation of its transport layer processing partially processes SMB protocol messages in order to improve write performance of a network attached storage device. FIGS. 9A-9B are flowcharts illustrating an example of transport layer processing of a server message block protocol message according to one or more techniques of this disclosure. Process 900 includes a process for transferring data from a network buffer to a file system object. In each of the examples illustrated in FIG. 9A and FIG. 9B, at the onset of process 900, a transport packet encapsulating an SMB protocol message is stored to a network buffer. It should be noted that in the case of SMB protocols, when a client and a server have established a connection and exchanged negotiate messages, during the session, only messages including the four byte transport headers are exchanged. However, it should be noted that in some cases, SMB protocol message packets may be encrypted. In some cases, the transport layer processing of computing device 200 may only be able to determine whether a command is a write command in the case of non-encrypted messages.

Referring to FIG. 9A, at 902, computing device 200 reads the transport header and the SMB header from a network buffer. That is, referring to FIG. 4 in the case where an SMB2 message encapsulated in a transport packet, computing device 200 reads the first 68 bytes of the transport packet. In the example illustrated in FIG. 9A, at 904, a determination is made as to whether the length of the transport layer is greater than a threshold. That is, the value of the length field in the transport header is determined and compared to a threshold value. As described above, SMB protocols include various command codes and in the case of a read response command and a write request command, the buffer of an SMB protocol message includes data read from a file or data to be written to a file. As such, in most cases, read response messages and write request messages are longer than SMB protocol messages associated with other commands. Thus, according to the techniques described herein, computing device 200 may infer whether an SMB protocol message is likely to be a read response or a write request based on whether the value of the length field in a transport packet header is greater than or equal to a threshold. In one example, the threshold may be in the range of 4,096 to 16,384 bytes. Further, in one example, the threshold value may be set to 8,192 bytes. In one example, computing device 200 may include a configuration file including the threshold value.

In cases where an SMB protocol message is not likely to be a read response or a write request based on the length being less than a threshold, the remaining bytes may be read from the network buffer by invoking a second read call. In the example illustrated in FIG. 9A, if it is determined that the value of length is not greater than or equal to a threshold value, the remaining bytes are read from the network buffer. That is, a read call reading bytes corresponding to the length field value is invoked (906). In cases where an SMB protocol message is likely to be a read respond or a write request based on the length of being greater than or equal to a threshold, the transport layer processing of computing device 200 may check whether the SMB command field indicates a read response or a write request command. It should be noted that the examples illustrated in FIGS. 9A and 9B, are described with respect to a write request. However, it should also be noted that the techniques described herein are equally applicable to a read response. That is, at 908 (additionally or alternatively), a determination may be made as to whether a command is equal to a read command and further, at 910, when a command is equal to a read response, the read header may be read.

In the example illustrated in FIG. 9A, if it is determined that the value of length is greater than or equal to a threshold value, the value of the SMB command field is checked at 908 to determine whether it corresponds to a write command That is, the transport layer processing of computing device 200 may determine whether the command field (e.g., the two byte command field bytes 13 and 14 in the SMB header) of a request message has a value indicating a write command (e.g., 0x0009). As illustrated in FIG. 9A, in one example, upon determining that the command field does not include a value corresponding to a write command, the transport layer processing of computing device 200 may read the remaining bytes (906).

As illustrated in FIG. 9A, upon determining that the command field does include a value corresponding to a write command, at 910, the SMB write header is read from the network buffer. As described above, in a write request, the first 48 bytes of a SMB2 data may be referred to as a write header. Thus, reading the SMB write header from the network buffer may include invoking a read command reading the first 48 bytes of a SMB2 data from the network buffer. As described above, with respect to FIG. 7, fields in the write header describe the data included in write request buffer. That is, DataOffset field and Length field provide the offset from the SMB2 header and the length of the data request data to be written. According to information provided in the write header, at 912, computing device 200 may cause data included in the buffer of an SMB protocol message to be written to a corresponding file object. In one example, computing device 200 may copy data from the network buffer to a file system object using a zero copy method (e.g., splice, recvfile, etc.).

Referring to FIG. 9B, FIG. 9B is similar to the process illustrated in FIG. 9A with the difference in the processes being that FIG. 9B does not include a determination whether the length is greater than or equal to a threshold. As described above, in a typical implementation, in order to cause file data in an SMB protocol message to be written to a corresponding file system object, an additional read operation is required. With respect to FIG. 9A and FIG. 9B the number of read operations is optimized based on whether a SMB protocol message is likely a write command Such an optimization improves write performance.

Figure 10:
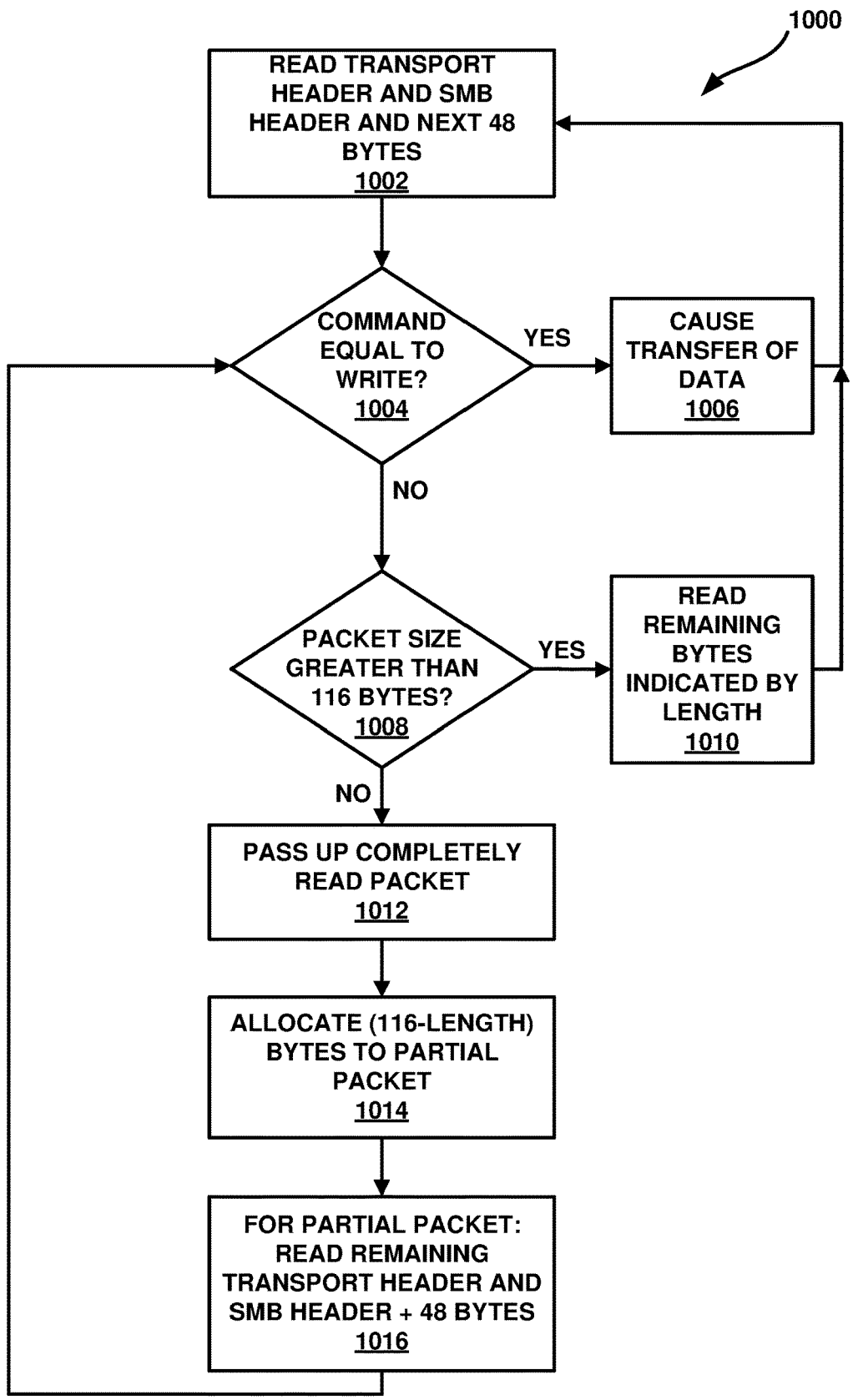
FIG. 10 is a flowchart illustrating an example of transport layer processing of a server message block protocol message according to one or more techniques of this disclosure.

As described above, in a write request, the first 48 bytes of a SMB2 data include the write header describing the data included in write request buffer. Thus, in the case of a transport packet including a SMB2 write request, the first 116 bytes (4 byte transport header+64 byte SMB2 header+ 48 byte write header) of the transport packet include all of the information describing the data included in the write request buffer. Thus, in order to improve write performance (i.e., network throughput) it may be useful for a device to have access to a write header as soon as possible, that is upon the first reading of a transport packet stored to a network buffer. FIG. 10 illustrates an example process 1000 where access to a write header is provided as soon as possible. Referring to FIG. 10, at 1002, the first 116 bytes (4 byte transport header+64 byte SMB2 header+potential 48 byte write header) of the transport packet are read. At 1004, a determination is made whether the command equals a write command and thus whether the packet is a write request. In the case where the command is equal to a write command, according to information provided in the write header, which has been read at 1002, at 1006, computing device 200 may cause data included in the buffer of an SMB protocol message to be written to a corresponding file object.

In the case where the command is not equal to a write command, the read 116 bytes may correspond to a partial SMB2 message or one complete SMB2 message and one partial SMB2 message. Whether the read 116 bytes correspond to a partial SMB2 message or one complete SMB2 message and one partial SMB2 message may be determined based on the value of the length field in the transport header. Thus, at 1008, it is determined whether the packet size, as provided by the value of length field, is greater 116 bytes. In the case where the packet size is greater than 116 bytes (i.e., the read 116 bytes correspond to a partial SMB2 message), at 1010, the remaining bytes forming the packet are read (as indicated by length, i.e., Remaining packet bytes=Length– 116 bytes) and the process repeats at 1002 as packets are received packets are processed. It should be noted that in the example illustrated in FIG. 10, the special case where the value of the length field is equal to 116 bytes is not separately described. However, this case can be handled as a special case under either outcome of 1008. For example, 1010 could include reading 0 bytes, in the case where the value of the length field is equal to 116 bytes.

Referring again to FIG. 10, in the case where the packet size is not greater than 116 bytes (i.e., the read 116 bytes correspond to a complete SMB2 message and a partial SMB2 message), at 1012, the completely read packet is passed up for protocol layer processing. At 1014, the read bytes forming the partial SMB2 message are allocated, as such. That is, the partially read packet includes the read 116 bytes excluding the bytes forming the complete packet as indicated by the length field corresponding to the complete packet. For the partially read packet, it is desirable to determine whether the partially read packet corresponds to a write command and in the case where the partially read packet does correspond to a write command, to cause the transfer of data as soon as possible. Thus, it is desirable to cause the 4 byte transport header and 64 byte SMB2 header and the potential 48 byte write header of the partially read packet to be available at the next read operation. At 1016, the unread portion of the 4 byte transport header and 64 byte SMB2 header of the partially read packet and the next 48 bytes (which may include a write header) are read. It should be noted that the number of bytes of the partially read packet that have been read is equal to 116 bytes minus the length of the complete packet (partially read packet=(116 bytes−Length)). Thus, at 1016, in order to cause the next 48 bytes to be read, length bytes are read (116 bytes−(116 bytes−Length)=Length). As illustrated in FIG. 10, after 1016, for the partially read packet, a determination may be made if it corresponds to a write request and the process 1000 may repeat for any number of received packets that need to be processed.

In this manner, computing device 200 represents an example of a device configured to read a transport packet header and a server message block header from a transport packet by invoking a first read call, wherein the transport packet includes a transport packet header, a server message block header, and a server message block data payload, check a value of a command field from the read server message block header, and conditionally read data from the server message block data payload based on whether the value of the command field indicates a write command.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for transferring data from a network buffer to a file system object, the method comprising:
    reading a transport packet header and a server message block header from a transport packet by invoking a first read call to the network buffer, wherein the transport packet includes a transport packet header, a server message block header, and a server message block data payload;
    determining whether the value of a length field in the read transport header is greater than a threshold value; and
    based on the determination, performing one of:
        checking a value of a command field in the read server message block header in the case where the value of the length field is greater than or equal to the threshold value, and reading only data forming a write command header from the server message block data payload by invoking a second read call to the network buffer in a case where the command field in the server message block header indicates a write command; or
        reading all of the server message block data payload by invoking a second read call to the network buffer in the case where the value of the length field is less than the threshold value.

2. The method of claim 1, wherein the threshold value is in the range of 4,096 to 16,384 bytes.

3. The method of claim 2, wherein the threshold value is 8,192 bytes.

4. The method of claim 1, wherein reading only data forming a write command header from the server message block data payload includes reading the first 48 bytes from the server message block data payload.

5. The method of claim 1, wherein reading the transport packet header and the server message block header includes reading only the first 68 bytes of the transport packet.

6. A device comprising one or more processors configured to:
reading a transport packet header and a server message block header from a transport packet by invoking a first read call to a network buffer, wherein the transport packet includes a transport packet header, a server message block header, and a server message block data payload;
determine whether the value of a length field in the read transport header is greater than a threshold value; and
based on the determination, perform one of:
checking a value of a command field in the read server message block header in the case where the value of the length field is greater than or equal to the threshold value, and reading only data forming a write command header from the server message block data payload by invoking a second read call to the network buffer in the case where the command field in the server message block header indicates a write command; or
reading all of the server message block data payload by invoking a second read call to the network buffer in the case where the value of the length field is less than the threshold value.

7. The device of claim 6, wherein the threshold value is in the range of 4,096 to 16,384 bytes.

8. The device of claim 7, wherein the threshold value is 8,192 bytes.

9. The device of claim 6, wherein reading only data forming a write command header from the server message block data payload includes reading the first 48 bytes from the server message block data payload.

10. The device of claim 9, wherein reading the transport packet header and the server message block header includes reading only the first 68 bytes of the transport packet.

11. A method for transferring data from a network buffer to a file system object, the method comprising:
reading a first transport packet header and a first server message block header from a first transport packet by invoking a first read call to the network buffer, wherein the first transport packet includes a first transport packet header, a first server message block header, and a first server message block data payload;
determining the value of a length field in the read first transport packet header is less than a threshold value;
in response to determining that the value of the length field in the read first transport packet header is less than the threshold value, reading all of the first server message block data payload by invoking a second read call to the network buffer;
reading a second transport packet header and a second server message block header from a second transport packet by invoking a third read call to the network buffer, wherein the second transport packet includes a second transport packet header, a second server message block header, and a second server message block data payload;
determining the value of a length field in the read second transport packet header is greater than or equal to the threshold value;
in response to determining that the value of the length field in the read second transport packet header is greater than or equal to the threshold value, checking a value of a command field in the read second server message block header;
determining the command field in the read second server message block header indicates a write command; and
in response to determining that the command field in the read second server message block header indicates a write command, reading only data forming a write command header from the second server message block data payload by invoking a forth read call to the network buffer.

12. The method of claim 11, wherein reading only data forming a write command header from the second server message block data payload includes reading only the first 48 bytes of the second server message block data payload.

13. The method of claim 12, further comprising causing data included in the second server message block data payload to be written to a corresponding file object based on information in the read data forming the write command header.

14. A method for transferring data from a network buffer to a file system object, the method comprising:
reading only a transport packet header and a server message block header from a transport packet by invoking a read call to the network buffer, wherein the transport packet includes a transport packet header, a server message block header, and a server message block data payload;
determining the value of a length field in the read transport packet header is greater than or equal to the threshold value;
in response to determining that the value of the length field is greater than or equal to the threshold value, checking a value of a command field in the read server message block header;
determining the command field header indicates a write command;
in response to determining that the command field indicates a write command, reading only data forming a write command header from the server message block data payload by invoking a second read call to the network buffer; and
causing data included in the server message block data payload to be written to a corresponding file object based on information in the read data forming the write command header.

15. The method of claim 14, wherein reading the transport packet header and the server message block header includes reading the first 68 bytes of the transport packet.

* * * * *